United States Patent [19]

McCluskey

[11] E Re. 31,598

[45] Reissued Jun. 5, 1984

[54] APERTURE FORMING DEVICE

[76] Inventor: John R. McCluskey, Unique Techniques, Inc., P.O. Box 68, Hannacroix, N.Y. 12087

[21] Appl. No.: 221,033

[22] Filed: Dec. 29, 1980

Related U.S. Patent Documents

Reissue of:

[64] Patent No.: 4,157,807
Issued: Jun. 12, 1979
Appl. No.: 689,954
Filed: May 25, 1976

U.S. Applications:

[63] Continuation of Ser. No. 580,871, May 27, 1975, abandoned, which is a continuation of Ser. No. 423,151, Dec. 10, 1973, abandoned.

[51] Int. Cl.[3] ..... B28B 7/28

[52] U.S. Cl. ..... 249/177; 249/183

[58] Field of Search ..... 249/43, 63, 150, 177, 249/183, 186, 217; 52/699, 700, 701

[56] References Cited

U.S. PATENT DOCUMENTS

| | | | |
|---|---|---|---|
| 1,680,542 | 8/1928 | Hintze | 249/177 |
| 2,728,126 | 12/1955 | Whitlock | 249/177 |
| 3,265,349 | 8/1966 | Hamrick | 249/177 |
| 3,437,309 | 4/1969 | Tausanovitch | 249/43 |
| 3,469,817 | 9/1969 | Bowden et al. | 249/177 |
| 3,705,469 | 12/1972 | Eriksson | 249/63 |

FOREIGN PATENT DOCUMENTS

| | | | |
|---|---|---|---|
| 680724 | 2/1964 | Canada | 249/177 |
| 733784 | 7/1955 | United Kingdom | 249/183 |
| 866164 | 4/1961 | United Kingdom | 249/183 |
| 888200 | 1/1962 | United Kingdom | 249/177 |
| 888202 | 1/1962 | United Kingdom | 249/177 |
| 905303 | 9/1962 | United Kingdom | 249/177 |
| 910699 | 11/1962 | United Kingdom | 249/183 |
| 918426 | 2/1963 | United Kingdom | 249/177 |
| 923882 | 4/1963 | United Kingdom | 249/183 |

*Primary Examiner*—John McQuade
*Attorney, Agent, or Firm*—Philip Furgang

[57] ABSTRACT

Disclosed is a device for forming apertures in cement or similar hardenable, plastic materials. The device, intended for use where holes of several inches in length are desired, comprises a body portion having affixed therein a threaded nut or coil. The body portion may be, for example, cylindrical in shape and be a solid elastomeric material having an aperture which extends axially through the body portion and communicates with a nut. The nut should be located adjacent the topmost portion of the body portion. A threaded rod may be inserted in the body aperture and screwed into the nut. A U-shaped bracket is provided which is placed on the hardened cement with the legs of the U-shape disposed on either side of body member. The joining member (which completes the U-shape) is spaced above and from the body portion by the legs. The joining member has a slot for receiving the bolt. The device is removed by threading a nut on the bolt down upon the joining member of the bracket. As the nut is turned, the rod is lifted. The lifting of the rod exerts pressure on the nut within the body member which then resiliently elongates the body portion and removes it from the cement.

9 Claims, 9 Drawing Figures

APERTURE FORMING DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of application Ser. No. 580,871 filed May 27, 1975, now abandoned, which was in turn a continuation of application Ser. No. 423,151 filed Dec. 10, 1973, now abandoned.

BACKGROUND OF THE INVENTION

This invention relates to the construction industry and more particularly to those substantially elastomeric devices intended to make apertures of predetermined configuration in such plastic materials as cement or the like. In further particularity, such apertures are of relatively small dimensions as conduit openings through walls, floors, or shallow receptacles therein.

In the erection of buildings or other structures made of cement, or a similar hardenable plastic material, it is frequently necessary to provide holes in the floor slabs. These holes are intended to accommodate or receive water or steam pipes, electrical conduits, and the like. The passage of steam pipes from a basement-installed boiler upwardly to the various rooms is but one example of the need for pre-formed floor openings. The passage of electrical conduits or water pipes, not only from floor to floor but between rooms, is but another example of the need for pre-formed holes. In addition, because of the varying sizes of such conduits, pipes, and the like, the shape of the holes need not necessarily by cylindrical. Thus, while cylindrical openings may be preferable, such opening may also be elipsoid, semi-cylindrical, and so on.

In the past, a number of devices have been suggested for forming openings in such hardenable plastic material as cement. Some devices have been intended to form conduits of substantial length, as in cement pipes or channels running the length of walls. Most frequently, devices for such conduits include the use of a thin-walled rubber tube having wires or cables drawn therethrough so that when the plastic material hardens, the wires may be pulled upon to deform the rubber tube away therefrom, thereby forming the conduits. Their construction, however, is exceedingly complicated and not readily applicable to such uses as forming of smaller apertures through cement walls and floors.

Amongst the aperture forming devices for forming pipes that have been suggested is one proposed by Murray (U.S. Pat. No. 1,534,134). Murray proposes the use of a highly resilient solid rubber member to be placed in a mold box. This particular means of forming a pipe in a hardenable plastic material, such as cement, is most difficult to be used since there is no ready means of removal of the rubber when the cement has hardened. As disclosed by Murray, however, the solid rubber member is disposed adjacent a mold box cover. It is believed that as such, the rubber unit may be easily plied out of the box, leaving a channel therein. If one were to attempt to draw the rubber solid along its length then the forces at the very edge of the resilient solid, it will cause the rubber solid to break apart and remain within the cement itself.

A number of expedients are believed to have been resorted to in the creation of floor and wall slab holes of smaller dimension. One common practice is to nail an inverted previously opened beer or soft drink can directly to the floor or wall foundation prior to pouring the concrete. After the concrete has been poured, the circular wall at the top of the can may be punctured and an effort can be made to pull the can from its surrounding cement by means of a hook. However, due to the strong bond which frequently obtains between the metal can and the surrounding concrete, it becomes difficult to extract the can. Simetimes the can is merely left within the wall. However, can sizes are of limited dimensions and not readily available for the numbers of holes required. Further, the existence of ragged metal edges at an opening is not desirable. Cutting tools required to cleanly cut open such cans for more established use on a construction site would be an added inconvenience and cost, as well as the cost of material. It should be borne in mind that for everyone of the many, many holes in such construction, cans would be required which could not be reused.

Another approach to making apertures in a plastic type material is that suggested by Bowden et al. (U.S. Pat. No. 3,469,817). Bowden et al. suggests a hole pattern member formed of an elastomeric material. The member comprises a cylindrical casing with spokes or veins terminating substantially at the center thereof, the hub or center of the member is twisted, the veins thereby draw in the outer cylindrical surface so as to expedite removal from the concrete. The difficulty with this device is that in frequent usage, the veins must be constantly flexed, thereby resulting in what is believed a limited life span. What is more, cement may eventually find its way between the veins, thereby restricting the ability of the user to collapse the member so that it may be removed from the cement structure.

The longer the length, more than five inches, the veins will, it is believed, fail to fully collapse. In addition, cement walls may, by virtue of the weight of the cement, cause the device to prematurely flex, thereby rendering the aperture useless. What is more, the forces necessary to deform the casing are applied directly and radially through the spokes, thereby requiring a direct deal of force. The frequent flexing and the considerable internal deformation makes this device, it is believed, to be inconvenient and of a limited reuse life.

In the making of apertures in plastic materials, Chetirko (U.S. Pat. No. 3,172,163) has suggested one approach, but one not suitable to hardenable plastic materials. In this instance, Chetirko recommends the use of a rigid core for reducing the hole size in bowling balls. The core is threaded and a bolt is pushed down through it so that after the material is hardened, the bolt may be pushed down and cut the base, thereby removing the core from the bowling ball. However, if this were done with an elastomeric material, the result would be that it would deform under the pressure and the bolt would be removed, leaving the elastomeric material securely within the cement structure.

SUMMARY OF THE INVENTION

It is an object of this invention to provide a device for forming apertures in plastic material, said device being reuseable.

It is another object of this invention to provide an aperture forming device which may be placed in a plastic material while the material is in a fluid state and removed when the plastic material has become rigid.

It is a further object of this invention to provide means for forming apertures of different designs usng the same inventive concept for each aperture forming device of each design.

It is still another object of this invention to provide an aperture forming device which is economical in manufacture and simple in use.

It is still a further object of this invention to provide an aperture forming device capable of being inserted into such a plastic material as cement and being removable therefrom when the cement has hardened, said device being removable by a simple tool and being capable of serving as a temporary sealer or cover for formed aperture until it is desired to be removed.

In accomplishing the foregoing object, and other objects which may become more apparent herein, there is provided an aperture forming means of the type intended to be disposed in a hardenable plastic material. The aperture forming means is disposed while the material is in a substantially fluid state. Upon the material becoming substantially rigid, the aperture forming means is removable from the material, so as to form the aperture within the material. The aperture forming means comprises an elastomeric body portion, a substantially rigid member means within the body portion, and means for grasping the rigid member. The grasping means extends from within and without of the body portion so that it can engage the rigid member means to thereby remove the body portion and the rigid member means from the plastic material thereby forming the aperture.

In one embodiment of the invention, there is provided a substantially cylindrical elastomeric body portion having embedded therein a bolt with the threaded portion extending axially and without the body portion. The body portion is inserted into plastic material such as concrete. The concrete is floated in place and upon hardening, a bracket is fitted over the threaded portion of the rod. The threaded rod extends through the bracket and is engaged by a nut. As the nut is threaded down upon the rod, the rod pulls upwardly against the body portion removing it from the cement leaving the appropriate aperture.

In still another embodiment of the invention, the body portion has an axially disposed aperture extending within and through the body portion. A nut is encased within the body portion and about the aperture. A threaded rod is placed down through the threaded nut. After the plastic material has hardened, the rod is turned down into contact with the hardened material and the nut, which is engaged by the threaded rod, begins to thread its way up and thereby pull out the body portion from the hardened plastic material.

DESCRIPTION OF THE PREFERRED EMBODIMENTS

Figure 1:
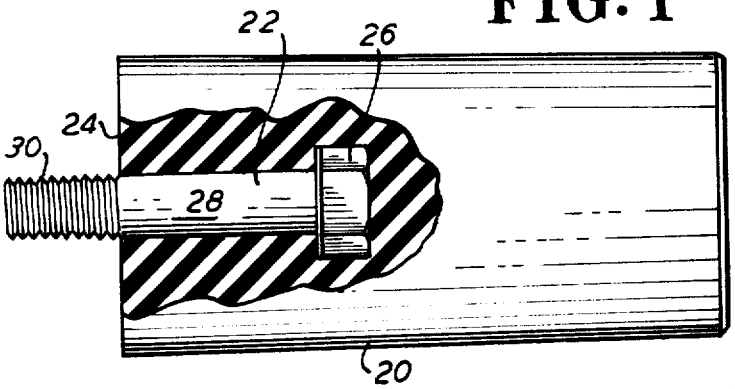
FIG. 1 is a partially sectioned front plan view of an aperture forming device constructed in accordance with the teachings of the invention.

The device of this invention is particularly suited for forming apertures of several inches in length, such as those intended to pass water or electric lines from wall to wall or between floors. This invention is characterized by an aperture forming body portion constructed of a unitary, substantially solid elastomeric material. Generally, the body portion is disposed within a hardenable plastic material, such as concrete, or for forming openings for temporary railings or guard rails cement or the like, while the material is in a fluid state. After the plastic material has hardened, the elastomeric body is only slightly deformed by subjecting it to forces and is thereby removed. Thus, it is believed that channels of considerable length, (e.g., exceeding more than several feet) would not be feasible with the device of this invention. Thus, for example, a body 20 may be preferably six or seven inches in length and have an overall width or diameter of approximately three to five inches. In other words, the length may be dictated by the overall thickness of the wall or floor through which or into which such an aperture is to be formed. The body portion may be made of any convenient elastomeric material such as rubber or neoprene having for example a durometer of 55 to 75, for example. A threaded bolt 22 may be placed or cast within the body portion 20 substantially near the top end 24 of the body portion 20. The bolt 22 may be so located that the head 26 is placed in a radial plane while the shaft 28 extends axially and without the body portion 20. A substantial portion of the shaft 28 extending out of the body portion 20 may be threaded 30. The body portion 20 generally may also have a slight taper of, for example, one degree. The bolt 22 may be of any well known configuration and material.

Figure 4:
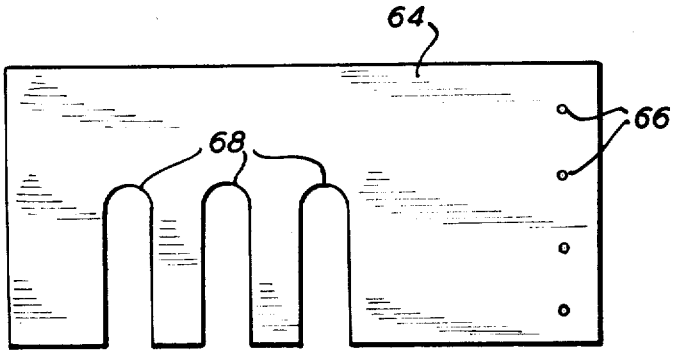
FIG. 4 is a top plan view of a bracket which may be used in connection with the device of FIG. 3.

In use, the body portion 20 may be placed in a floor which is to be formed of a plastic material such as, for example, cement (not shown). The body portion 20 may be placed in the area desired. Cement then is floated into place until it is level with the top portion 24 of the body portion 20 and allowed to harden. A bracket 64 (FIG. 4) may be made of wood or the like, and may be used to locate the body portion 20 and hold it in position while the cement hardens.

Figure 2:
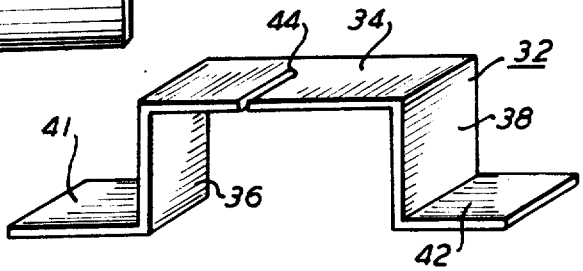
FIG. 2 is a perspective view of a bracket used in connection with the device of FIG. 1.

A bracket 32 (FIG. 2) may be used to remove the body portion 20. Thus, the bracket 32 may be substantially U-shaped, comprising a horizontal, joining wall 34 and opposed legs 36 and 38 and laterally extending flanges 40 and 42 extending outwardly from the free ends of the legs 36 and 38 of the U-shaped bracket 32.

The joining member 34 of the U-shaped bracket 32 may have one or more slots 44 therein.

In operation, the body portion 20 is placed within the form (not shown). The threaded portion 30 may be slipped through a slot 68 of the bracket 64 of FIG. 4 and held in place by a nut (not shown). The bracket 64 may be secured to the form as by nails (not shown) through nail holes 66. After the cement has hardened, the bracket 64 is removed and the bracket 32 is put in its place. The nut is then tightened down upon the threaded portion 30. As the nut is tightened down against the joining member wall 34, the bolt 22 is pulled upwardly. The head 26 prevents the threaded bolt 22 from being pulled out of the body portion 20 and the entire assembly 22 and 20 is then pulled out of the cement, leaving the aperture. It will be understood that the bracket 32 may be made of any rigid material such as steel and may take any other convenient shape.

Figure 3:
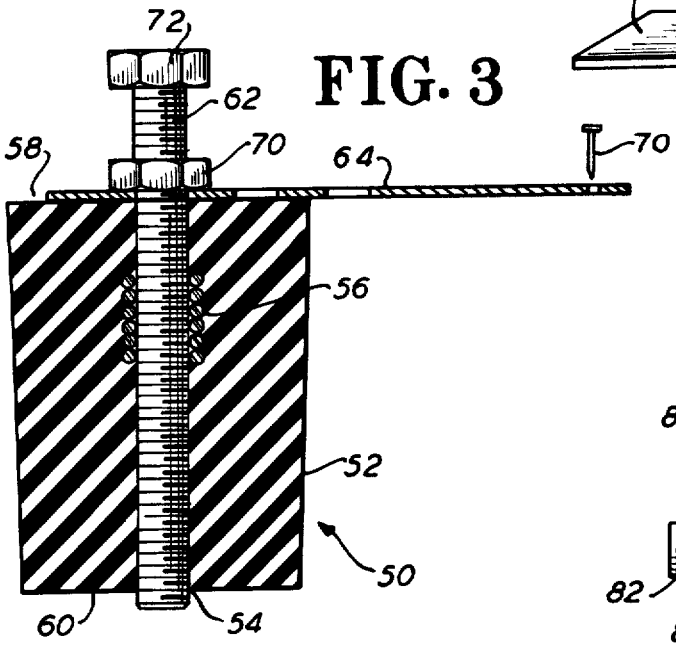
FIG. 3 is a sectional view of another aperture-forming device constructed in accordance with the teachings of the invention.

Turning to another embodiment, there is provided an aperture forming device 50 (FIG. 3). Once again, the body portion 52 may be made of any elastomeric material such as rubber or the like. As shown, the body portion 52 is cylindrical. However, any other convenient and desired shape may be used. Once again, the previously mentioned limitations on width and length are preferably to avoid the breaking of the body portion on removal from the hardened plastic material.

As shown herein, the body portion 52 is substantially cylindrical and solid in form. It should be noted that as with the previous body portion 20 of the device disclosed in FIG. 1, there may be provided a slight taper in order to aid in its removal from the hardened plastic material.

Axially disposed through the cylindrical body portion 52 may be an aperture 54. This body portion aperture 54 has a diameter substantially smaller than the overall diameter of the body portion 52. Formed within and secured threwithin the body portion aperture 54 may be a nut means, such as, for example, a coil 56. As used herein a nut refers to a nut, coil, coil nut, or the like. It is preferable that such a nut be located close to the top portion 58 of the body portion 52. As shown, such a nut 56 may be spaced approximately one-third of the overall length from the top.

When the body portion 52 is placed within the hardenable plastic material, a threaded rod 62 is threaded down through the nut 56 and into the body portion 52. The rod 62 is placed at the base of the body portion 52 thereby preventing the plastic material from rushing into the aperture 54. The body portion 52 may be placed within the appropriate form prior to the floating in of the material. The bracket (FIG. 4) may be used to locate and hold the body portion 52 in place. The rectangular bracket may have along one edge thereof nail holes 66. Along the other, longer edge thereof and extending into the bracket 64 may be slots 68. The bracket 64 may be made of any well known rigid material such as steel or wood. The bracket 64 may be secured to the form board (not shown) as with nails 70 inserted through the nail holes 66. The slot 68 may fit about the threaded rod 62. A free running nut 70 may be on the threaded rod 62 between its head 72 and the bracket 64.

In use after the cement has hardened, the nut 70 may be threaded away from the bracket 64 and the head 72 threaded downwardly and out of the body portion 52. As the rod 62 is tightened down (the bracket 64 having first been removed), the elastomeric material 52, such as rubber, is resiliently stretched and pulled out of the hole by the force of the nut 56 within the body portion 52. It is essential that the nut of these devices herein be disposed adjacent the top and preferably within a third of the axial length. The force of the rod 62 against the cement or the form at the base 60 of the device 50 is transmitted to the coil 56, so as to cause the material 52 to elongate and thereby be jacked out of the cement.

(Primed numbers herein indicate similarly shaped elements herein which serve similar purposes.)

Figure 5:
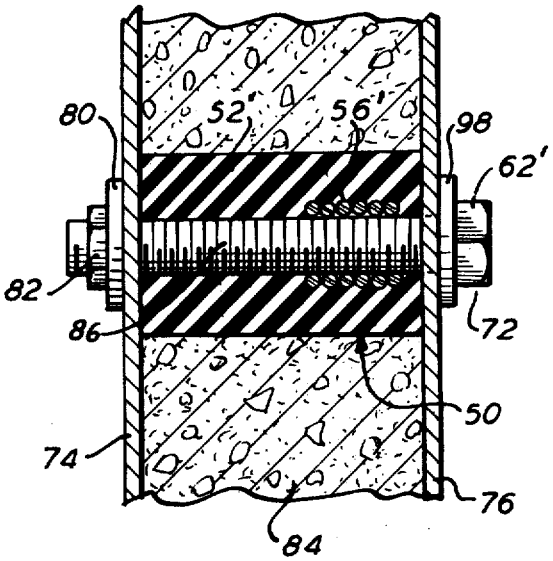
FIG. 5 is a sectional side view of an aperture forming device constructed in accordance with the teachings of this invention.

One application of the aperture forming device 50 may be for the formation of holes through walls or floors. Thus, for example, in a wall there may be disposed between opposed forms 74 and 76 (FIG. 5) a body portion 52' which may be, for example, cylindrical in shape and having therein a threaded nut 56'. The forms 74 and 76 may have apertures (not shown) which are in registry with one another. The body portion 52' of the elastomeric material is disposed between the forms 74 and 76. A threaded rod 62' may have thereon a washer 98 which may be made, for example, of steel. The threaded rod 62' may be inserted through the aperture in the form 76, the body portion 52', and aperture in the opposed form 74 and without. A second steel washer 80 may be disposed over the end of the threaded rod 62' and a free running nut 82 may be secured thereon. After the cement 84 or similar plastic material has been floated or poured into place and permitted to harden, the forms 74 and 76 may be removed by first removing the nut 82, bolt 62', and washers 98 and 80. Thus, it will be seen that the bolts 62' serve to hold the forms 74 and 76 in place. The body portion 52' may be permitted to remain in place to seal the aperture until such time as it is needed, thereby keeping out foreign objects from clogging the aperture until used. It is preferable that the body portion 52' be first loosened within the aperture it forms so that the cement 84 does not become bound to the body portion 52' by extended contact.

It should be noted that the forms 74 and 76 may be made of any well known material as commonly known in the art such as metal, steel, fiberglass, wood or the like. To remove the body portion 52' to form the aperture all that is required is that a bracket 32 or the like be affixed to the wall 84 and the entire unit be jacked out, as has previously been described. Thus, the forms 74 and 76 having been removed, the rod 62' may be rethreaded so as to extend a part way out of the body portion 52'. The bracket 32 (FIG. 2) may be placed over the rod 62' so as to engage the slot 44. Then the head 72 is rotated down and the threads 86 of the rod 62' engage the threaded nut 56' to thereby resiliently elongate the body portion 52' and removes it from the wall 84.

Still another consideration is the instance when a floor is to be cast in cement or other plastic material and it is desired to locate a body portion. Clearly, the type having a threaded nut secured on both sides of a form (such as in FIG. 5) may not be practical or convenient. In addition, it may be desired to form a shallow aperture or cup. In this connection, a device, such as that disclosed in FIG. 1 may be employed. In order to locate such devices, within a form, there may be provided a locating means 90 which may be substantially in the shape of a top hat. The crown 92 may be in the form of a cylindrical tube open at both ends. The base of the tube 92 may be secured to a laterally extending brim 94. The brim 94 may be secured to a form 96 as by staples 98 or the like, or other securing means. The crown 92 should extend up a fraction of the overall length of the desired body portion (not shown). Thus, for example, the crown 92 is attached to the form 96 for a floor (which may be, for example, 16 inches in thickness). The crown 92 may have an overall length of four inches so as to support the body portion therewithin and hold it in place while the cement or similar plastic material is floated into place. It is believed that the lower the crown 92, the greater likelihood that a body portion would be floated out of place. The brim 94 may be removed when the lower form 96 is removed. Unlike cans, the brim 94 is exterior of the crown and easily detachable therefrom, as by lines of weakening. The device 90 may be made, for example, of a plastic.

Figure 7:
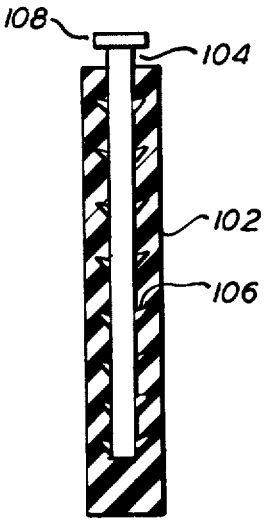
FIG. 7 is a sectional view of an aperture-forming device constructed in accordance with the teachings of this invention.
Figure 8:
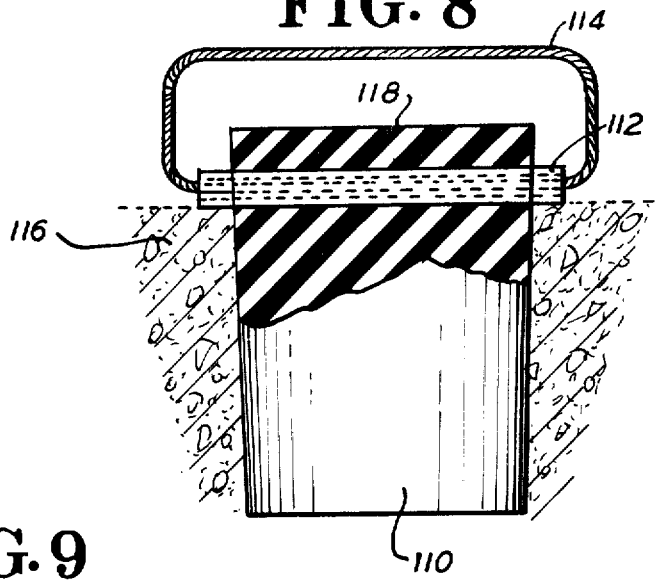
FIG. 8 is a sectional view of another device constructed in accordance with the teachings of this invention.

In another embodiment of this invention, the body portion 102 may be thin and elongated as, for example, a preferred length of no more than two feet and a diameter of up to one and one-half inches. Thus, the body portion 102 of an elastomeric material, such as rubber (FIG. 7) may have molded or otherwise formed therewithin and axially disposed along its length, a rod 104. The rod 104 may have burrs 106 as an integral part thereof so as to grip the body portion 102 and extending without. The exposed end of the rod 104 may be threaded, 108. Once placed within a hardenable plastic material, such as cement, it could be jacked out by the bracket 32 (FIG. 2), thereby forming rebar voids or apertures. Greater lengths than substantially more than two feet are believed to be impractical, causing the rubber or other elastomeric material to separate.

Still another embodiment is an elastomeric body portion 110 which may, for example, be cylindrical in shape and have the slight draft, as previously discussed. Extending radially through the body portion 110 and cast therewithin may be a rigid tube 112 which may, for example, be made of metal or the like. The tube 112 is located adjacent the top end 115 of the body portion 110. A cable or other handle forming device 114 may extend through the tube 112. This device, upon being placed in the plastic material 116, is then pulled out by means of a handle portion 114. The handle 114 may be, for example, a wire-like cable or the like.

Figure 9:
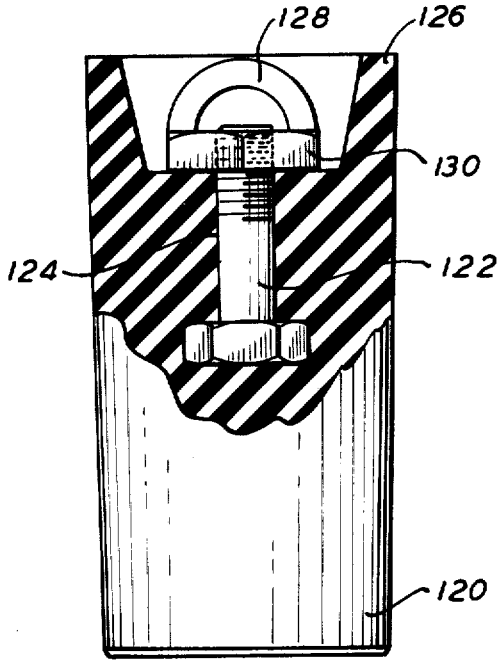
FIG. 9 is a partially sectioned front view of still another aperture-forming device constructed in accordance with the teachings of this invention.
Figure 6:
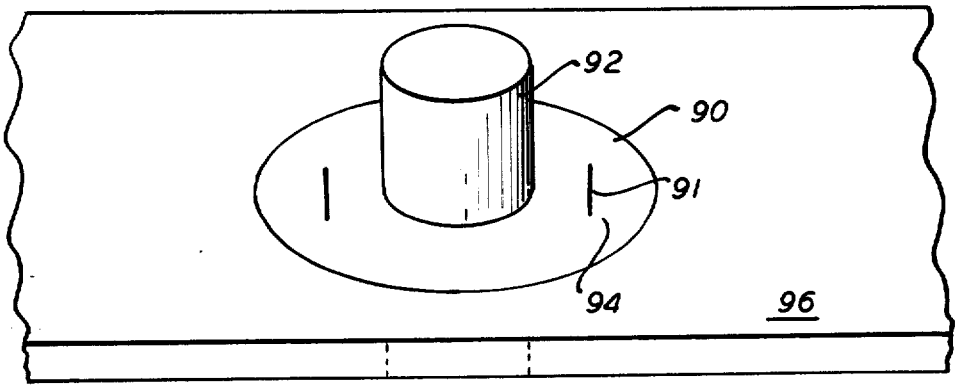
FIG. 6 is a perspective view of a locating device constructed in accordance with the teachings of this invention.

Still another embodiment is a cylindrical body portion 120 (FIG. 9) in which a bolt 122 is cast therewithin being axially disposed with the shaft 124 of the bolt extending axially. The top end 126 of the body portion 120 may be countersunk and have therewithin a ring-like member 128 secured to a nut 130. This particular device may be thus removed by engaging the ring 128 as by means of a crowbar (not shown) or the like. As is well known, a crowbar may be brought down against a brace or edge of a form (not shown) to lift the body portion 120 out of the hardened material, thereby leaving the aperture.

Thus, there has been disclosed a substantially solid, elastomeric device having therewithin a rigid member. The rigid member is engaged by an elongated rod. The force of the rod upon the rigid member deforms the device along its length. Such deformation removes the contact with the hardened plastic material which aids in its removal therefrom. Because of this general principle, not believed to have been heretofore employed in this context, apertures of any desired shape may be had.

What is claimed is:

[1. Aperture forming means of the type intended to be disposed within a hardenable plastic material while said material is in a substantially fluid state and, upon said material becoming substantially rigid, said forming means being removable from said material to thereby form therewithin said aperture, said aperture forming means comprising:

(a) an elastomeric body portion having top and bottom portions, the top portion being intended to be disposed adjacent to and accessible through the exposed surface of the plastic material;

(b) substantially rigid member means secured within said body portion;

(c) means for grasping said rigid member means, said grasping means extending from within and without said body portion for engaging said rigid member means and for removing said body portion and said rigid member means from the hardened plastic material; and (d) locating means for securing to a form to thereby locate and receive therein said body portion within the plastic material.]

2. Aperture forming means as recited in claim [1] *4*, wherein said locating means further comprises flange means for securing to the form and having upstanding support means extending therefrom to retain therein said body portion in a predetermined position.

3. Aperture forming means as recited in claim 2, wherein said body portion is substantially cylindrical, said locating means comprises a top-hat configuration such that said flange means is a radially extending brim, said upstanding support means is a substantially cylindrically-shaped crown open at the top to receive therein said cylindrical body portion; said crown extending a fraction of the axial length of said body portion.

*4. Aperture forming means of the type intended to be disposed within a hardenable plastic material while said material is in a substantially fluid state and, upon said material becoming substantially rigid, said material being of the type disposed upon or in a form, said forming means being removable from said material to thereby form therewithin said aperture, said aperture forming means comprising:*

*(a) an elastomeric body portion having top and bottom portions, the top portion being intended to be disposed adjacent to and accessible through the exposed surface of the plastic material wherein said body portion is a substantially geometric solid, in which the end defining said top portion is at least as large as or larger than said bottom portion;*

*(b) a substantially rigid member secured within and engaging said body portion and spaced from said top portion;*

*(c) means for grasping said rigid member; said grasping means extending from within and without said body portion for engaging said rigid member and for deforming said body portion so as to remove said body portion and said rigid member from the hardened plastic material; and*

*(d) locating means to thereby located said body portion within said plastic material; said locating means receiving therein said body portion and being securable to the form.*

*5. Aperture forming means of the type intended to be disposed within a hardenable plastic material while said material is in a substantially fluid state and, upon said material becoming substantially rigid, said material being of the type disposed upon or in a form; said forming means being removable from said material to thereby form therewithin said aperture, said aperture forming means comprising:*

*(a) an elastomeric body portion having top and bottom portions, the top portion being intended to be disposed*

*adjacent to and accessible through the exposed surface of the plastic material within said body portion is a substantially geometric solid, in which the end defining said top portion is at least as large as or larger than said bottom portion;*

*(b) a substantially rigid member secured within and engaging said body portion and spaced from said top portion;*

*(c) means for grasping said rigid member, said grasping means extending from within and without said body portion for engaging said rigid member and for deforming said body portion so as to remove said body portion and said rigid member from the hardened plastic material; and*

*(d) locating means to thereby locate said body portion within the plastic material; said locating means being securable to the form and engaging said grasping means; said locating means comprises a bracket having slots therein for selectively engaging said grasping means.*

*6. Aperture forming means of the type intended to be disposed within a hardenable plastic material while said material is in a substantially fluid state and, upon said material becoming substantially rigid, said material being of the type disposed upon or in a form, said forming means being removable from said material to thereby form therewithin said aperture, said aperture forming means comprising:*

*(a) an elastomeric body portion having top and bottom portions and an aperture, the top portion being intended to be disposed adjacent to and accessible through the exposed surface of the plastic material wherein said body portion is a substantially geometric solid, in which the end defining said top portion is at least as large as or larger than said bottom portion;*

*(b) a substantially rigid member secured within and engaging said body portion and space from said top portion; said rigid member comprises an internally threaded nut;*

*(c) locating means to thereby locate said body portion within the plastic material; said locating means comprises a bracket; and*

*(d) means for grasping said rigid member, said grasping means extending from within and without said body portion for engaging said rigid member and for deforming said body portion so as to remove said body portion and said rigid member from the hardened plastic material; said means for grasping comprises a threaded member insertable within said aperture for engaging said nut and exterior nut means threaded upon said threaded member and against said bracket; said bracket being upon the exterior portion of the rigid plastic material such that, upon tightening down upon said bracket by said exterior nut means, said threaded member pulls upon said secured nut to thereby remove said body portion from said hardened plastic material.*

*7. Aperture forming means as recited in claim 6, wherein said bracket is a substantially U-shaped planar member; the base, which joins the arms of said U-shaped member, having at least one opening therewithin to engage the threaded member; said bracket arms with laterally extending free ends for resting securely upon rigid plastic material.*

*8. Aperture forming means as recited in claim 7, wherein said body portion comprises a substantially cylindrical member, said body portion aperture being axially disposed, said nut being embedded within said body portion and having the aperture thereof in registry with said body portion aperture, said threaded member comprising a threaded bolt of the type having a bolt head at one end, said body portion being tapered along the length thereof, such that the largest diameter thereof is disposed at said top portion.*

*9. Aperture forming means of the type intended to be disposed within a hardenable plastic material while said material is in a substantially fluid state and, upon said material becoming substantially rigid, said material being of the type disposed upon or in a form, said forming means being removable from said material to thereby form therewithin said aperture, said aperture forming means comprising:*

*(a) an elastomeric body portion having top and bottom portions and an aperture, the top portion being intended to be disposed adjacent to and accessible through the exposed surface of the plastic material wherein said body portion is a substantially geometric solid, in which the end defining said top portion is at least as large as or larger than said bottom portion;*

*(b) a substantially rigid member secured within and engaging said body portion and spaced from said top portion; said rigid member comprises an internally threaded nut;*

*(c) means for grasping said rigid member, said grasping means extending from within and without said body portion for engaging said rigid member and for deforming said body portion so as to remove said body portion and said rigid member from the hardened plastic material, said grasping means comprises a threaded member insertable within said aperture for engaging said nut; and*

*(d) locating means to thereby locate said body portion within the plastic material, said locating means comprises a bracket having slots therein for selectively engaging said grasping means.*

*10. Aperture forming means of the type intended to be disposed within a hardenable plastic material while said material is in a substantially fluid state and, upon said material becoming substantially rigid, said material being of the type disposed upon or in a form, said forming means being removable from said material to thereby form therewithin said aperture, said aperture forming means comprising:*

*(a) an elastomeric body portion having top and bottom portions, the top portions being intended to be disposed adjacent to and accessible through the exposed surface of the plastic material wherein said body portion is a substantially geometric solid, in which the end defining said top portion is at least as large as or larger than said bottom portion;*

*(b) a substantially rigid member secured within and engaging said body portion and spaced from said top portion;*

*(c) means for grasping said rigid member, said grasping means extending from within and without said body portion for engaging said rigid member and for deforming said body portion so as to remove said body portion and said rigid member from the hardened plastic material; said grasping means comprises a substantially rod-like member extending from within and without said body portion, said rigid member comprises a head member integrally formed at one end of said rod-like member and extending radially from said rod-like member; and*

*(d) locating means to thereby locate said body portion within the plastic material, and a bracket and nut*

*means wherein said rod-like member comprises a threaded portion, said bracket engages said threaded portion, said nut means being upon said rod-like member for tightening down upon said threaded portion and against said bracket; said bracket being intended to engage the hardened plastic material in such a manner that said nut means upon being rotated upon said threaded portion pulls against said head member and body portion so as to thereby deform said elastomer and remove said aperture forming means from the plastic material.*

* * * * *